United States Patent
Lohan et al.

(10) Patent No.: US 12,423,483 B2
(45) Date of Patent: Sep. 23, 2025

(54) METHOD OF DESIGNING FLUID FLOW FIELD STRUCTURE FOR FUEL CELL BIPOLAR PLATE

(71) Applicant: Toyota Motor Engineering & Manufacturing North America, Inc, Plano, TX (US)

(72) Inventors: Danny J. Lohan, Northville, MI (US); Yuqing Zhou, Ann Arbor, MI (US); Ercan M. Dede, Ann Arbor, MI (US); Feng Zhou, Ann Arbor, MI (US); Hiroshi Ukegawa, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 1049 days.

(21) Appl. No.: 17/472,110

(22) Filed: Sep. 10, 2021

(65) Prior Publication Data
US 2023/0079046 A1 Mar. 16, 2023

(51) Int. Cl.
*G06F 30/17* (2020.01)
*G06F 30/10* (2020.01)
(Continued)

(52) U.S. Cl.
CPC ............. *G06F 30/10* (2020.01); *G06F 30/17* (2020.01); *H01M 8/0258* (2013.01);
(Continued)

(58) Field of Classification Search
CPC .......... G06F 30/10; G06F 30/17; G06F 30/12; G06F 30/28; G06F 2113/08;
(Continued)

(56) References Cited

U.S. PATENT DOCUMENTS

| 6,989,214 B2 | 1/2006 | Mao et al. |
| 7,641,871 B2 * | 1/2010 | Futami ................ B01F 33/3039 422/198 |

(Continued)

OTHER PUBLICATIONS

Dede, E., et al. "Inverse Design of Fluid Flow Structure with Turing Pattern" arXiv:1911.05832v1 (Nov. 2019) (Year: 2019).*
(Continued)

*Primary Examiner* — Jay Hann
(74) *Attorney, Agent, or Firm* — Jordan IP Law, LLC

(57) ABSTRACT

One or more methods of designing an FC bipolar plate that enhance the operational performance of FC. A first image analysis is conducted of image data of a fluid flow field structure having one or more dehomogenized microstructures to identify channels having a fluid flow blockage at a channel wall dead-end. The channel wall dead-end of each identified channel is selectively removed in a manner that fluidically connects each identified channel to an adjacent channel. Then, a second image analysis of the image data is conducted in response to selectively removing the channel wall dead-ends to measure a length of each channel wall. Channels walls having a length greater than a threshold channel wall length value are selectively cut, thereby providing reduced fluid flow resistance throughout the FC.

20 Claims, 11 Drawing Sheets
(2 of 11 Drawing Sheet(s) Filed in Color)

(51) Int. Cl.
*G06F 113/08* (2020.01)
*H01M 8/0258* (2016.01)
*G06F 30/28* (2020.01)

(52) U.S. Cl.
CPC .......... *G06F 30/28* (2020.01); *G06F 2113/08* (2020.01); *Y02E 60/50* (2013.01)

(58) Field of Classification Search
CPC .. H01M 8/0258; H01M 8/026; H01M 8/0265; H01M 8/04305; H01M 2008/1095; Y02E 60/50
See application file for complete search history.

(56) References Cited

U.S. PATENT DOCUMENTS

| | | | | |
|---|---|---|---|---|
| 8,916,313 | B2* | 12/2014 | Shirvanian | H01M 8/0254 429/514 |
| 2001/0041281 | A1* | 11/2001 | Wilkinson | H01M 8/0258 429/480 |
| 2007/0105000 | A1* | 5/2007 | Chapman | C25B 15/08 429/534 |
| 2008/0226967 | A1* | 9/2008 | Tighe | H01M 8/0263 429/430 |
| 2018/0076469 | A1 | 3/2018 | Haase | |

OTHER PUBLICATIONS

Wilberforce, T., et al. "Computational Fluid Dynamic Simulation and Modelling (CFX) of flow Plate in PEM Fuel Cell Using Aluminum Open Cellular Foam Material" IEEE Texas Power & Energy Conf. (2017) available from <https://ieeexplore.ieee.org/abstract/document/7868285> (Year: 2017).*

Zeng, S. & Lee, P. "A Header Design Method for Target Flow Distribution among Parallel Channels Based on Topology Optimization" 17th IEEE ITHERM Conf., pp. 156-163 (2018) (Year: 2018).*

Li, X. & Sabir, I. "Review of bipolar plates in PEM fuel cells: Flow-field designs" Int'l J. Hydrogen Energy, vol. 30, pp. 359-371 (2005) (Year: 2005).*

* cited by examiner

METHOD OF DESIGNING FLUID FLOW FIELD STRUCTURE FOR FUEL CELL BIPOLAR PLATE

TECHNICAL FIELD

Embodiments relate generally to one or more methods of designing a fluid flow field structure for a bipolar plate of a fuel cell (FC) by performing one or more cutting sequences of one or more channel walls of the fluid flow field structure to enhance the operational performance of FC.

BACKGROUND

Conventional FC bipolar plate designs often utilize serpentine, parallel, branching, or interdigitated channel designs. These channel designs present competing tradeoffs between pressure drop, flow uniformity, and reaction density.

For instance, serpentine flow fields designs are known to have high pressure drop with relatively low reaction variation, while parallel channel designs often have much lower pressure drop yet lack uniform flow distribution from the inlet to the outlet.

Interdigitated flow field designs create flow channels that are generally not continuous from the inlet to the outlet. Because the flow channels are non-continuous fluid flow inlet to flow outlet, the fluid flow is forced under pressure to flow through a porous GDL layer and catalyst layer in order to reach adjacent flow channels fluidically connected to the outlet. Although this design removes water effectively from the electrode structure, all the flow and generated water upstream of the flow field are forced to flow through the porous electrode layer, which results in high flow pressure drops throughout the FC and channel flooding.

Some microchannel flow networks generated using algorithms suffer from fluid blockage. Due to the non-deterministic nature of some algorithms, the resulting channel wall lengths are unpredictable.

BRIEF SUMMARY

To address the aforementioned limitations, one or more embodiments set forth, described, and/or illustrated herein present one or more methods of designing a fluid flow field structure for an FC bipolar plate by modifying a continuous or long channel fluid flow field structure design to enhance the operational performance of the FC in terms of fluid flow distribution (i.e., reduced pressure drops). In particular, one or more methods overcome these aforementioned limitations by employing a bifurcated process. The initial process block involves identifying locations in the generated fluid flow field structure where fluid is blocked (i.e., dead-ends). The identified dead-ends are repaired or otherwise removed by cutting through a channel wall to obtain a fluidic connection with the nearest/adjacent neighboring channel. The second process block involves measuring the length of each channel wall in order to identify which walls are too long, i.e., has a measured channel length value that is greater when compared to a threshold channel wall length value. The channels walls exceeding the threshold channel wall length value will then be cut into one or more discrete, short channel wall sections to facilitate enhanced fluid flow distribution throughout the FC.

In accordance with one or more embodiments, a method of designing a fluid flow field structure for a fuel cell bipolar plate comprises, by one or more computing devices having one or more processors: conducting image analysis of image data of a fluid flow field structure having one or more dehomogenized microstructures to identify channels having a fluid flow blockage at a channel wall dead-end; and selectively removing, in response to the image analysis, the channel wall dead-end of each identified channel in a manner that fluidically connects each identified channel to an adjacent channel.

In accordance with one or more embodiments, a method of designing a fluid flow field structure for a fuel cell bipolar plate comprises, by one or more computing devices having one or more processors: conducting image analysis of image data of a fluid flow field structure having one or more dehomogenized microstructures to measure a length of each channel wall in the fluid flow field structure; and selectively cutting, in response to the image analysis, channels walls having a length greater than a threshold channel wall length value.

In accordance with one or more embodiments, a method of designing a fluid flow field structure for a fuel cell bipolar plate comprises, by one or more computing devices having one or more processors: conducting a first image analysis of image data of a fluid flow field structure having one or more dehomogenized microstructures to identify channels having a fluid flow blockage at a channel wall dead-end; selectively removing, in response to the image analysis, the channel wall dead-end of each identified channel in a manner that fluidically connects each identified channel to an adjacent channel; conducting, in response to selectively removing the channel wall dead-end, a second image analysis of the image data to measure a length of each channel wall in the fluid flow field structure; and selectively cutting, in response to the second image analysis, channels walls having a length greater than a threshold channel wall length value.

In accordance with one or more embodiments, a method of designing a fluid flow field structure for a fuel cell bipolar plate comprises, by one or more computing devices having one or more processors: concurrently conducting a first image analysis of image data of a fluid flow field structure having one or more dehomogenized microstructures to identify channels having a fluid flow blockage at a channel wall dead-end and a second image analysis of the image data to measure a length of each channel wall in the fluid flow field structure; selectively removing, in response to the image analysis, the channel wall dead-end of each identified channel in a manner that fluidically connects each identified channel to an adjacent channel; and selectively cutting, in response to the second image analysis and the removal of each channel wall dead-end, channels walls having a length greater than a threshold channel wall length value.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The various advantages of the one or more embodiments will become apparent to one skilled in the art by reading the following specification and appended claims, and by referencing the following drawings, in which:

DETAILED DESCRIPTION

Figure 1A:
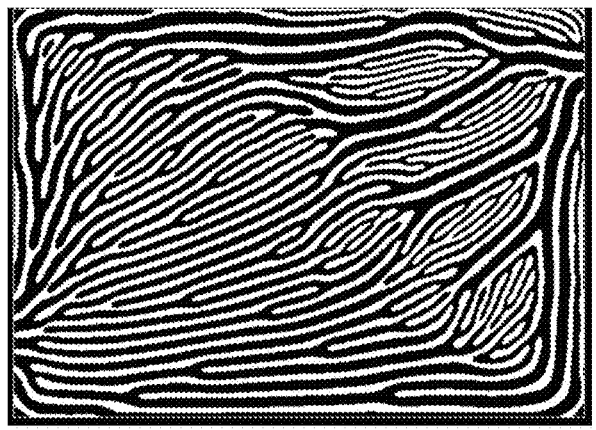
FIGS. 1A through 1C illustrate a schematic diagram of an example method of designing a fluid flow field for an FC bipolar plate, in accordance with one or more embodiments shown and described herein
Figure 1B:
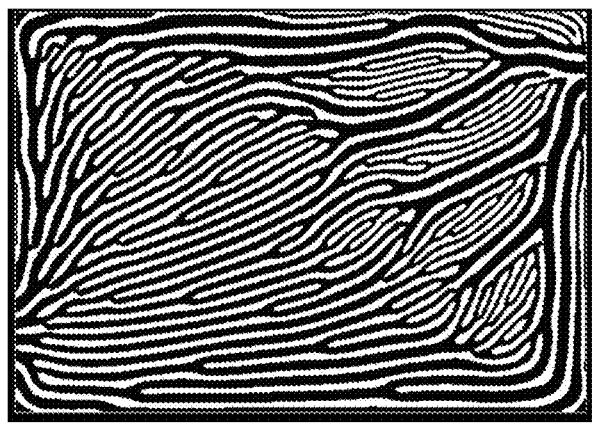
Figure 1C:
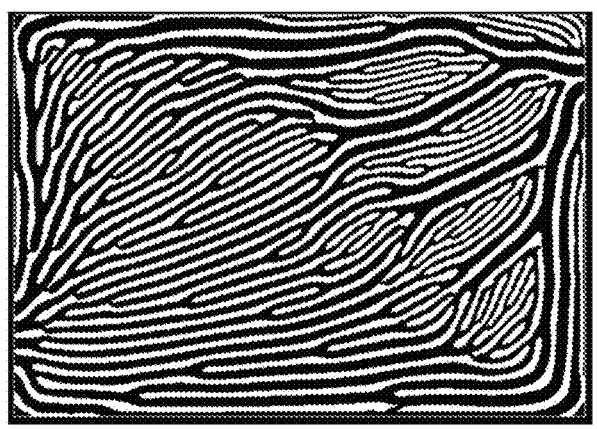

In the illustrated example embodiment of FIGS. 1A through 1C, an example method of designing a fluid flow field structure for an FC bipolar plate is described, in which white indicates a channel domain, and black indicates a wall domain.

In the illustrated example schematic diagram of FIG. 1A, an image capturing an optimized map of a fluid flow structure is provided. The fluid flow structure is generated, for example, by iteratively executing a gradient-based algorithm that incorporates objective functions of reaction variation and flow resistance, and then generating one or more dehomogenized microstructures such as, for example, Turing-pattern microstructures. Although the illustrated embodiment reveals a Turing-pattern microstructure, embodiments are not limited thereto. This disclosure contemplates a fluid flow field structure comprising any suitable structural configuration that falls within the spirit and scope of the principles of this disclosure.

In the illustrated example schematic diagram of FIG. 1B, after conducting a first image analysis (via one or more computing systems) of the image data illustrated in FIG. 1A to identify flow blockages or dead-ends in the optimized map of the fluid flow structure, the identified dead-ends are repaired or otherwise removed, as will be further described hereinbelow.

Figure 4:
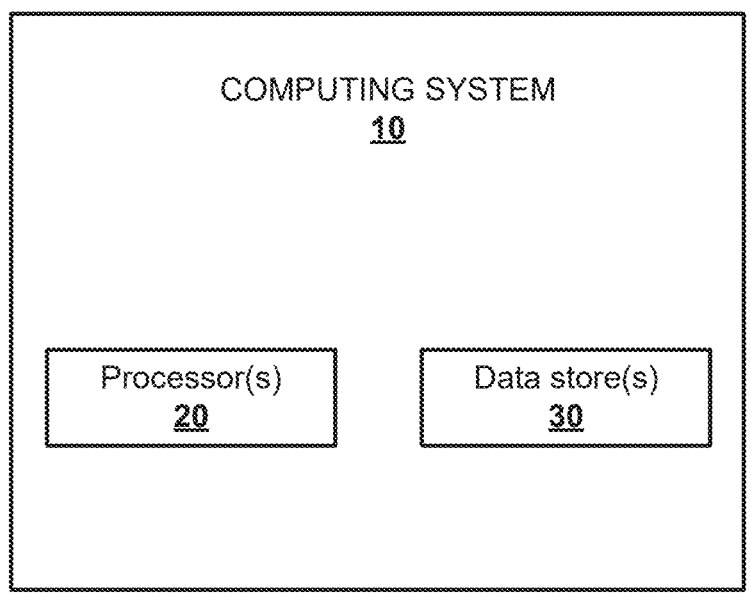
FIG. 4 illustrates an example computing system in one or more example methods of designing a fluid flow field for an FC bipolar plate, in accordance with one or more embodiments shown and described herein.

In the illustrated example of FIG. 4, each computing system 10 comprises one or more processors 20. As set forth, described, and/or illustrated herein, "processor" means any component or group of components that are configured to execute any of the processes described herein or any form of instructions to carry out such processes or cause such processes to be performed. The one or more processors 20 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 20 may comprise at least one hardware circuit (e.g., an integrated circuit) configured to carry out instructions contained in program code. In embodiments in which there is a plurality of processors 20, such processors 20 may work independently from each other, or one or more processors may work in combination with each other. The one or more processors 20 may be a host, main, or primary processor of the computing system 10.

In accordance with one or more embodiments, the computing system 10 may comprise one or more data stores 30 for storing one or more types of data. The computing system 10 may include interfaces that enable one or more systems thereof to manage, retrieve, modify, add, or delete, the data stored in the one or more data stores 30. The one or more data stores 30 may comprise volatile and/or non-volatile memory. Examples of suitable data stores 30 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 30 may be a component of the one or more processors 20, or alternatively, may be operatively connected to the one or more processors 20 for use thereby. As set forth, described, and/or illustrated herein, "operatively connected" may include direct or indirect connections, including connections without direct physical contact.

In the illustrated example schematic diagram of FIG. 1C, after conducting a second image analysis to measure the length of each channel wall in the fluid flow field structure, channels walls having a length greater than a threshold channel wall length value are cut into one or more short, discrete channel wall lengths. In accordance with one or more embodiments, the first image analysis and the second image analysis may be executed concurrently. Alternatively, the first image analysis and the second image analysis may be executed independently of each other.

In the illustrated example embodiment of FIGS. 2A through 2K, an example method of designing a fluid flow field structure for an FC bipolar plate is described. The illustrated embodiment provides greater technical detail of the illustrated example embodiment of FIGS. 1A through 1C.

Figure 2A:
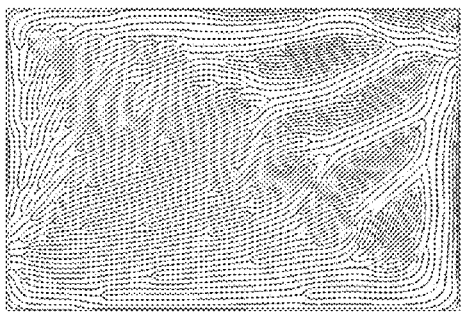
FIGS. 2A through 2K illustrate a schematic diagram of an example method of designing a fluid flow field for an FC bipolar plate, in accordance with one or more embodiments shown and described herein.

In the illustrated example schematic diagram of FIG. 2A, an image capturing an optimized map of a fluid flow structure is provided. In the illustrated example schematic diagram, red indicates a channel domain and blue indicates a wall domain. The fluid flow structure is generated, for example, by iteratively executing a gradient-based algorithm that incorporates objective functions of reaction variation and flow resistance, and then generating one or more dehomogenized microstructures such as, for example, Turing-pattern microstructures. Although the illustrated embodiment reveals a Turing-pattern microstructure, embodiments are not limited thereto. This disclosure contemplates a fluid flow field structure comprising any suitable structural configuration that falls within the spirit and scope of the principles of this disclosure.

Figure 2B:
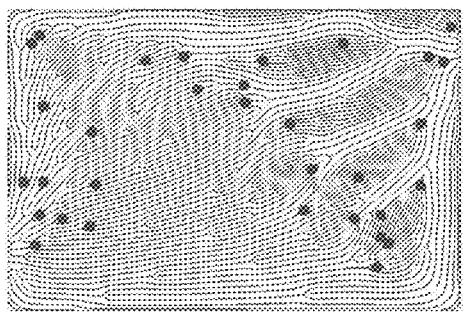

In the illustrated example schematic diagram of FIG. 2B, a first image analysis of the image data of the fluid flow field structure is conducted (via one or more computing devices having one or more processors) to identify fluid flow blockages or dead-ends as a first point (e.g., as a red dot) in the fluid flow field structure.

Figure 2C:
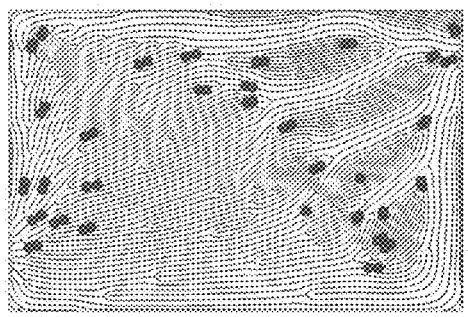

In the illustrated example schematic diagram of FIG. 2C, for each identified dead-end, the wall branch nearest in proximity or most adjacent thereto is then identified as a second point (e.g., as a blue dot).

Figure 2D:
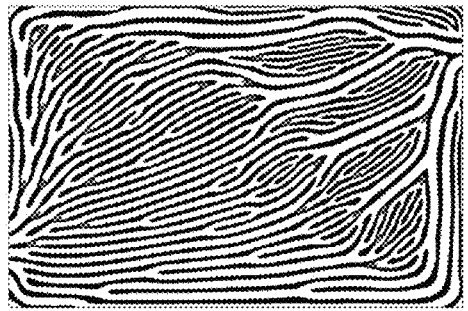

In the illustrated example schematic diagram of FIG. 2D, a line (e.g., in red) connecting/pairing the first point identified in FIG. 2B with the second point identified in FIG. 2C is executed.

Figure 2E:
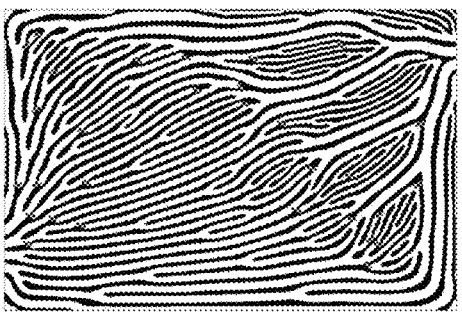

In the illustrated example schematic diagram of FIG. 2E, the line located between the first point and the second point is rotated by a predetermined rotation value (e.g., of $\pi/4$).

Figure 2F:
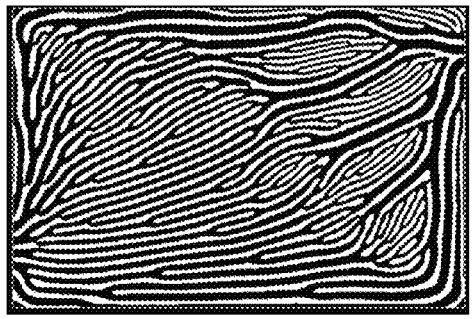

In the illustrated example schematic diagram of FIG. 2F, each channel dead-end is removed by applying a cut at the rotated line.

Figure 2G:
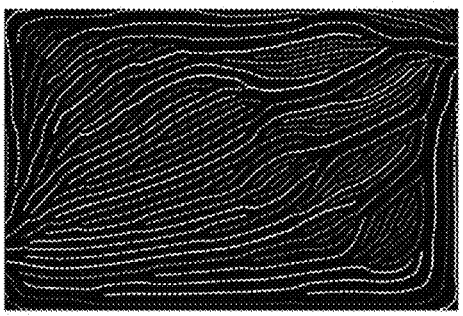

In the illustrated example schematic diagram of FIG. 2G, after removing the channel dead-ends, a second image analysis of the image data is conducted (via the one or more computing devices) to measure a length of each channel wall in the fluid flow field structure (using, for example, a color scale).

Figure 2H:
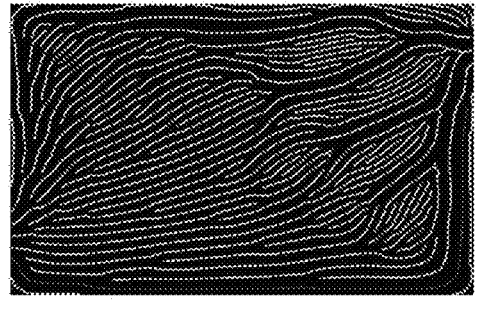

In the illustrated example schematic diagram of FIG. 2H, to identify which channels to reduce in length, the measured length value of each channel wall is compared to a threshold channel wall length value. The threshold channel wall length value may be derived based on the optimized pressure map of the fluid flow field structure and/or derived in accordance with predetermined performance objectives of the FC. Each channel wall having a measured length value that is greater than a threshold channel wall length value (e.g., channel wall in red) will be automatically cut. Those channel walls having a measured length value that is less than the threshold channel wall length value (see, those channel walls in light blue and yellow) will not be cut.

Figure 2I:
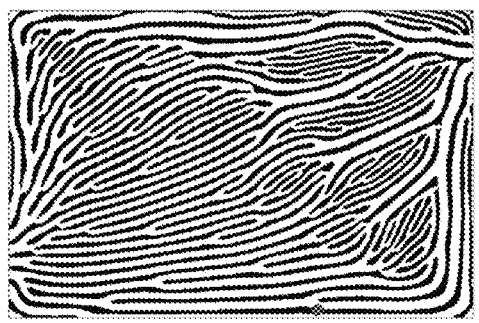

In the illustrated example of FIG. 2I, the location(s) of the cut(s) is identified (e.g., red dot).

Figure 2J:
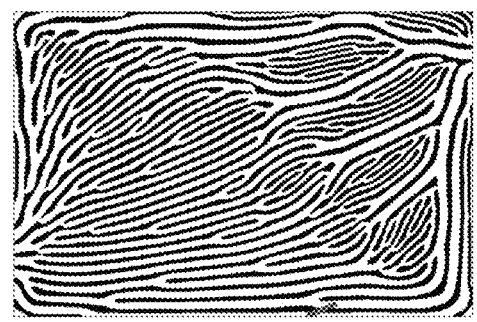

In the illustrated example of FIG. 2J, a line located at each identified cut location is rotated by a predetermined rotation value (e.g., of $\pi/4$).

Figure 2K:
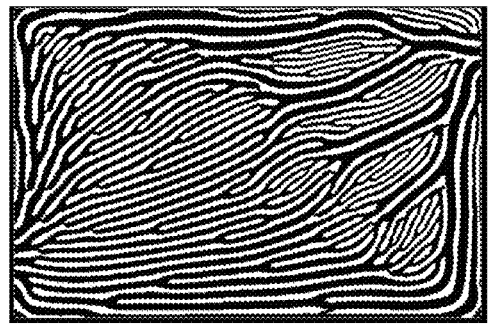

In the illustrated example schematic diagram of FIG. 2K, the length of the identified channel is then reduced by applying a cut at the rotated line.

Figure 3A:
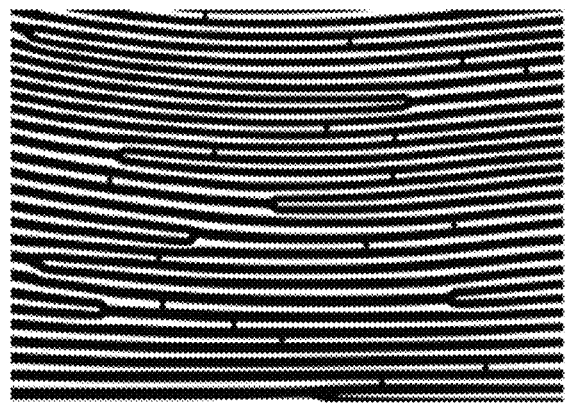
FIGS. 3A and 3B respectively illustrate an example channel wall cut in one or more example methods of designing a fluid flow field for an FC bipolar plate, in accordance with one or more embodiments shown and described herein.

In accordance with the illustrated example of FIG. 3A, the cut(s) may be applied approximately perpendicular to the channel wall.

Figure 3B:
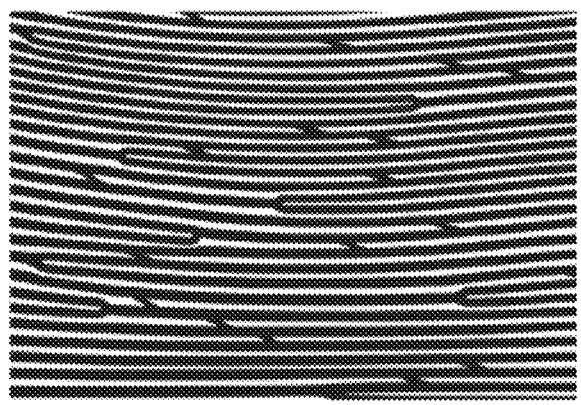

In accordance with the illustrated example of FIG. 3B, alternatively, the cut(s) may be applied approximately oblique to the channel wall.

FIGS. 5 through 10 respectively illustrate a flowchart of example methods 500, 600, 700, 800, 900, and 1000 of designing a fluid flow field structure for an FC bipolar plate, in accordance with one or more embodiments. Each method 500, 600, 700, 800, 900, and 1000 is to yield an optimized design of a fluid flow field fuel configuration that minimizes pressure drop across the FC.

The flowchart of methods 500, 600, 700, 800, 900, and 1000 corresponds in whole or in part to the illustrations of FIGS. 1 through 5 set forth and described herein. In accordance with embodiments, one or more process blocks set forth in the methods 500, 600, 700, 800, 900, and 1000 may be implemented, for example, using logic instructions (e.g., software), configurable logic, fixed-functionality hardware logic, etc., or any combination thereof. As an example, software executed on one or more computing systems such as computing system 10 may provide functionality described or illustrated herein. Each computing system respectively includes one or more processors, such as the one or more processors 20. In particular, software executing on one or more computer systems may perform one or more fabrication or processing blocks of the methods 500, 600, 700, 800, 900, and 1000 set forth, described, and/or illustrated herein or provides functionality described or illustrated herein.

Figure 5:
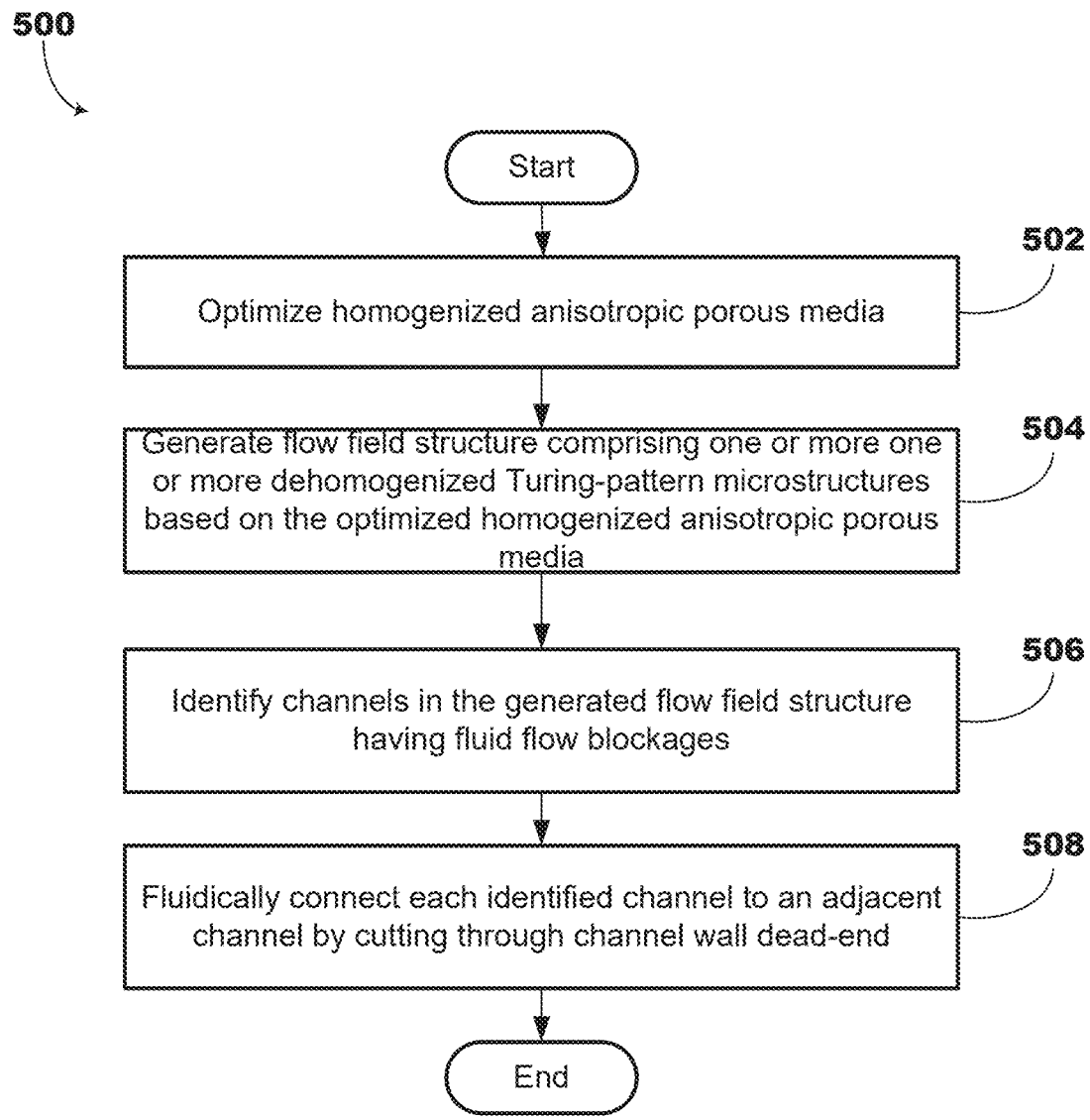
FIGS. 5 through 10 respectively illustrate a flowchart of example methods of designing a fluid flow field structure for an FC bipolar plate, in accordance with one or more embodiments shown and described herein.

As illustrated in FIG. 5, in the method 500, illustrated processing block 502 includes optimizing, by one or more computing devices having one or more processors, homogenized anisotropic porous media by iteratively executing a gradient-based algorithm that incorporates objective functions of reaction variation and flow resistance.

The method 500 can then proceed to illustrated process block 504, which includes generating, by the one or more computing devices and based on the optimized homogenized anisotropic porous media, a fluid flow field structure for a bipolar plate body. The fluid flow field structure can comprise one or more dehomogenized Turing-pattern microstructures, but embodiments are not limited thereto. Thus, this disclosure contemplates the fluid flow field structure comprising any suitable structural configuration that falls within the spirit and scope of the principles of this disclosure.

The method 500 can then proceed to illustrated process block 506, which includes identifying, by the one or more computing devices, channels in the fluid flow field structure having fluid flow blockages at channel dead-ends.

The method 500 can then proceed to illustrated process block 508, which includes fluidically connecting, by the one or more computing devices, each identified channel to an adjacent channel by selectively cutting through the channel wall dead-end. The method 500 can then terminate or end after execution of process block 508.

Figure 6:
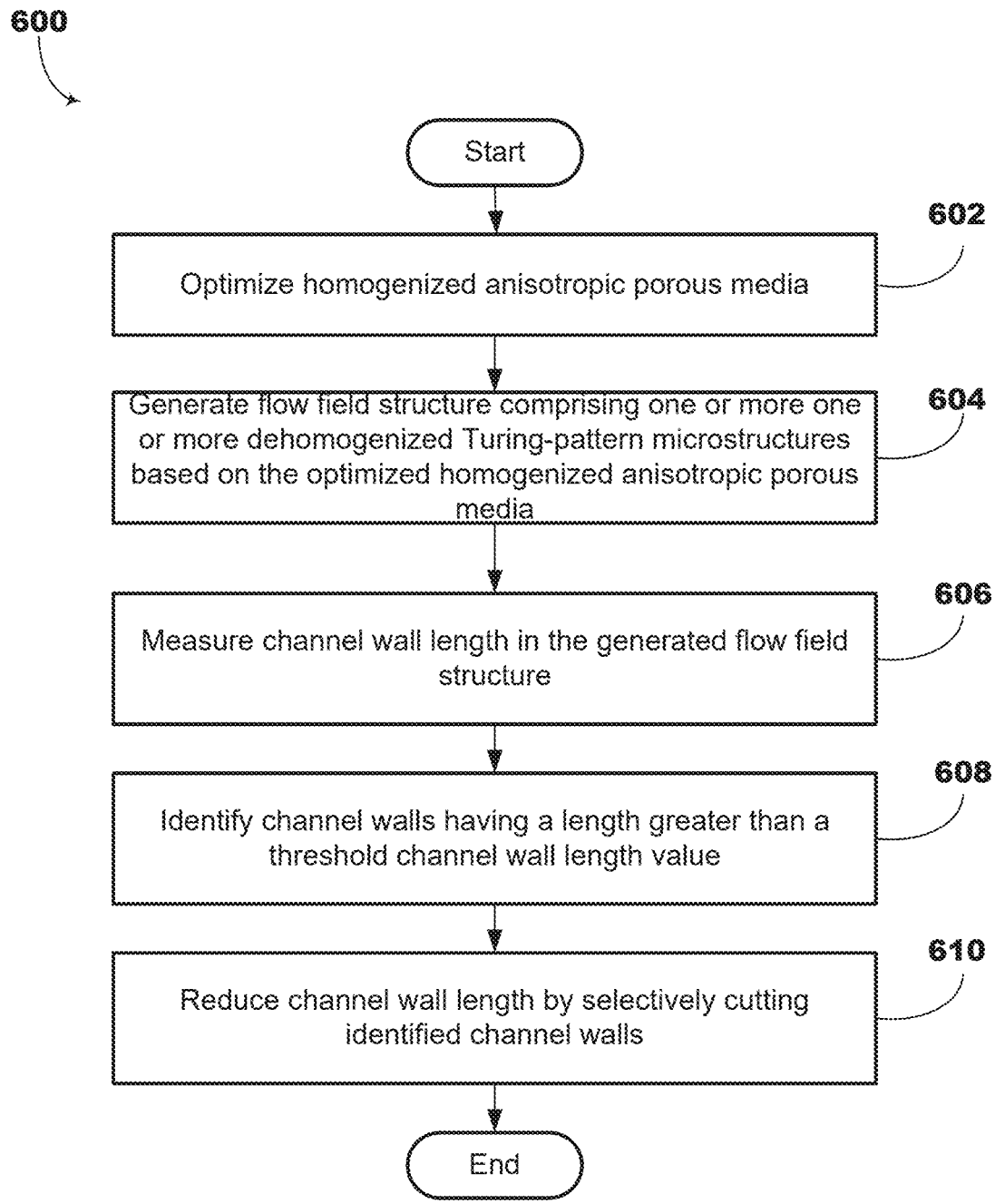

As illustrated in FIG. 6, in the method 600, illustrated processing block 602 includes optimizing, by one or more computing devices having one or more processors, homogenized anisotropic porous media by iteratively executing a gradient-based algorithm that incorporates objective functions of reaction variation and flow resistance.

The method 600 can then proceed to illustrated process block 604, which includes generating, by the one or more computing devices and based on the optimized homogenized anisotropic porous media, a fluid flow field structure for a bipolar plate body. The fluid flow field structure can comprise one or more dehomogenized Turing-pattern microstructures, but embodiments are not limited thereto. Thus, this disclosure contemplates the fluid flow field structure comprising any suitable structural configuration that falls within the spirit and scope of the principles of this disclosure.

The method 600 can then proceed to illustrated process block 606, which includes measuring, by the one or more computing devices, the channel wall lengths in the generated flow field structure.

The method 600 can then proceed to illustrated process block 608, which includes identifying, by the one or more computing devices, channel walls having a length greater than a threshold channel wall length value.

The method 600 can then proceed to illustrated process block 610, which includes reducing, by the one or more computing devices, the channel wall length of the identified channel walls by selectively cutting the channel walls. The cutting may be comprise applying one or more cuts that are approximately perpendicular to the identified channel wall or oblique to the identified channel wall. The method 600 can then terminate or end after execution of process block 610.

Figure 7:
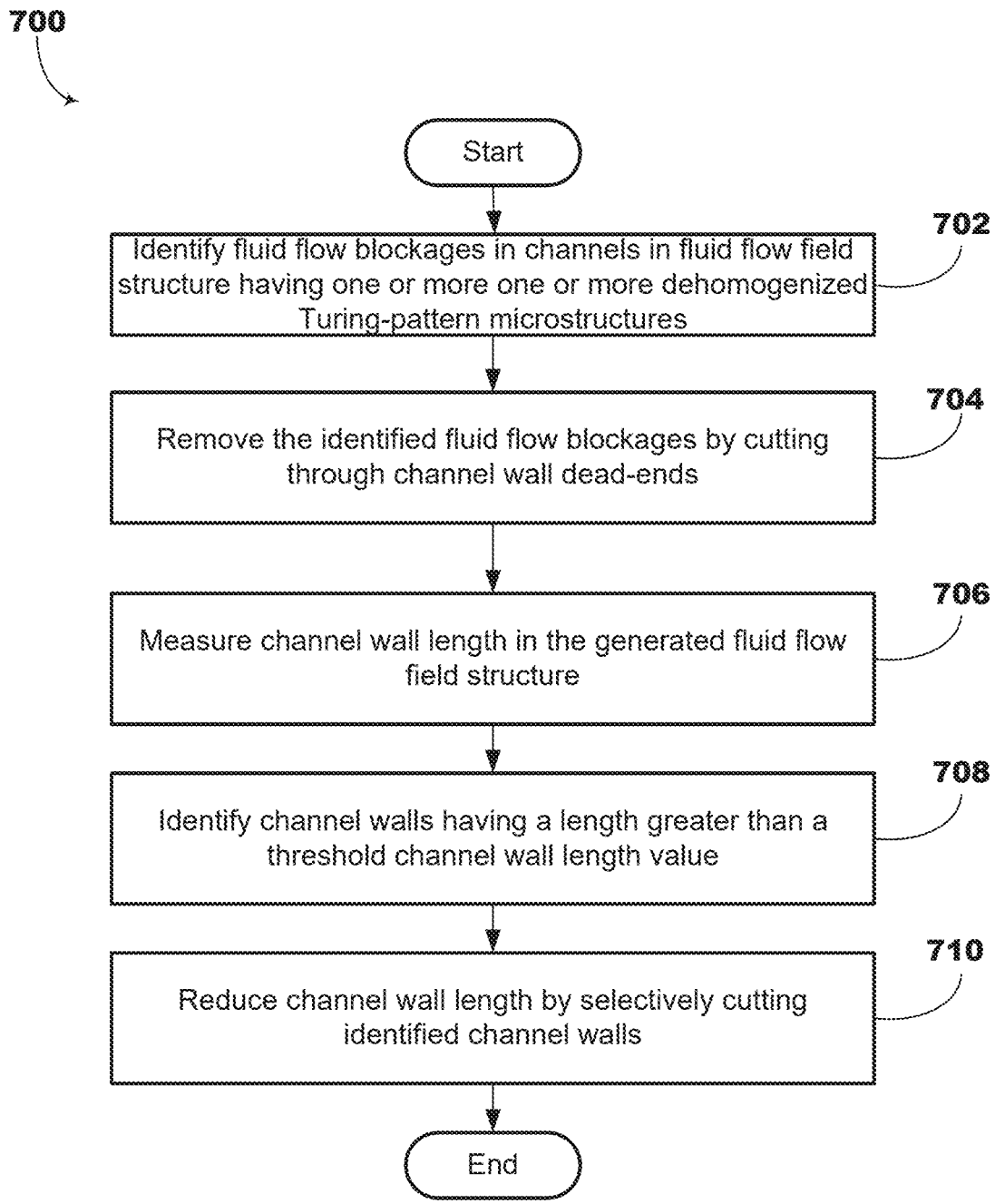

As illustrated in FIG. 7, in the method 700, illustrated processing block 702 includes identifying, by one or more computing devices having one or more processors, fluid flow blockages at channel dead-ends in the flow field structure.

The method 700 can then proceed to illustrated process block 704, which includes removing, by the one or more computing devices, each identified channel wall dead-end by cutting through the channel dead-end and fluidically connected adjacent channels.

The method 700 can then proceed to illustrated process block 706, which includes measuring, by the one or more computing devices and after cutting through the channel dead-end, the channel wall lengths in the flow field structure.

The method 700 can then proceed to illustrated process block 708, which includes identifying, by the one or more computing devices, channel walls having a length greater than a threshold channel wall length value. The identification can comprises comparing the measured channel wall length value to the threshold channel wall length value stored in one or more data stores of the one or more computing devices or operatively connected to the one or more computing devices.

The method 700 can then proceed to illustrated process block 710, which includes reducing, by the one or more computing devices, the channel wall length of the identified channel walls by selectively cutting the channel walls. The cutting may be comprise applying one or more cuts that are approximately perpendicular to the identified channel wall or oblique to the identified channel wall. The method 700 can then terminate or end after execution of process block 710.

Figure 8:
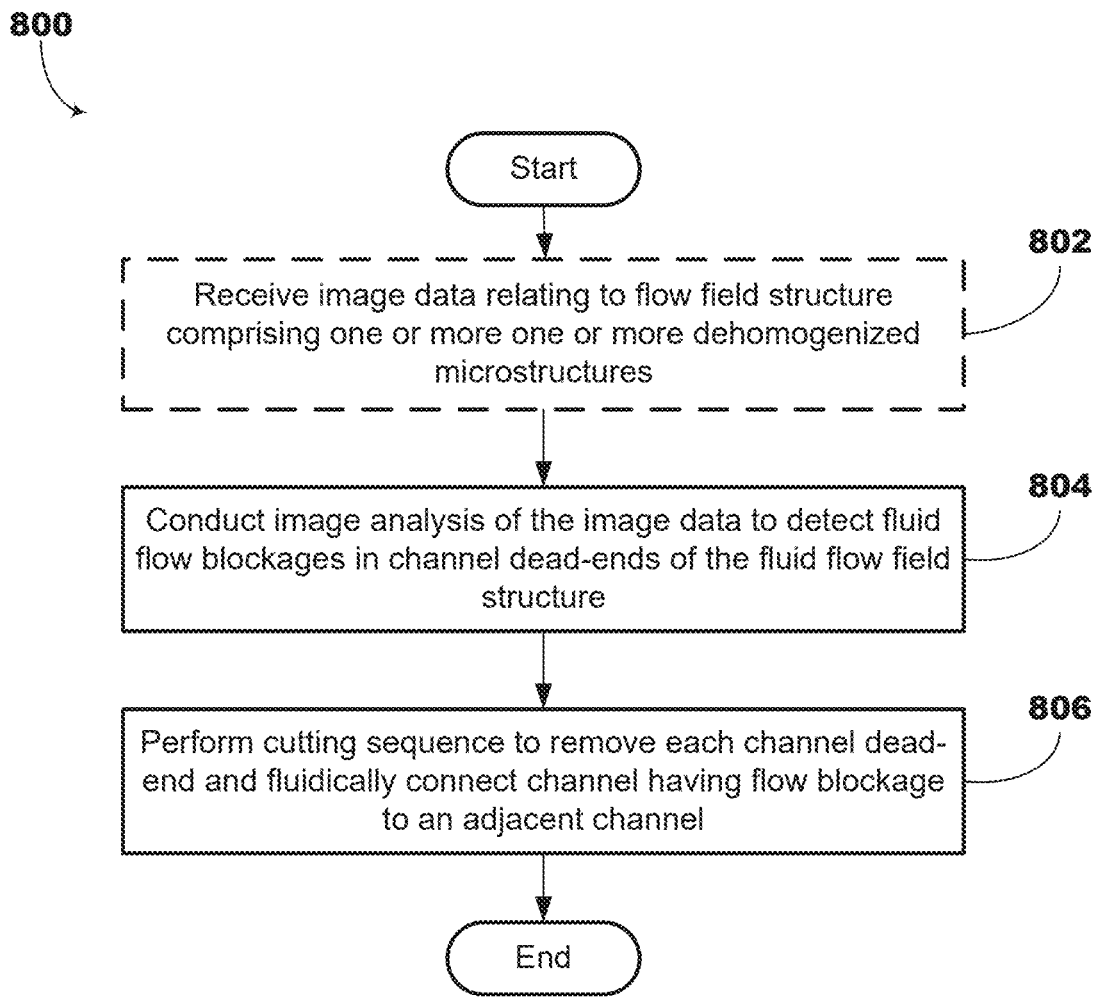

As illustrated in FIG. 8, in the method 800, illustrated processing block 802 includes receiving, by one or more computing devices having one or more processors, image data relating to a fluid flow field structure for a bipolar plate body. The fluid flow field structure can comprise one or more dehomogenized microstructures such as, for example, Turing-pattern microstructures, but embodiments are not limited thereto. Thus, this disclosure contemplates the fluid flow field structure comprising any suitable structural configuration that falls within the spirit and scope of the principles of this disclosure.

The method 800 can then proceed to illustrated process block 804, which includes conducting, by the one or more computing devices, image analysis of the image data to detect fluid flow blockages at channel dead-ends of the fluid flow field structure.

The method 800 can then proceed to illustrated process block 806, which includes performing a cutting sequence, by the one or more computing devices in response to the image analysis, to remove each channel dead-end in a manner that fluidically connects adjacent channels. The method 800 can then terminate or end after execution of process block 806.

Figure 9:
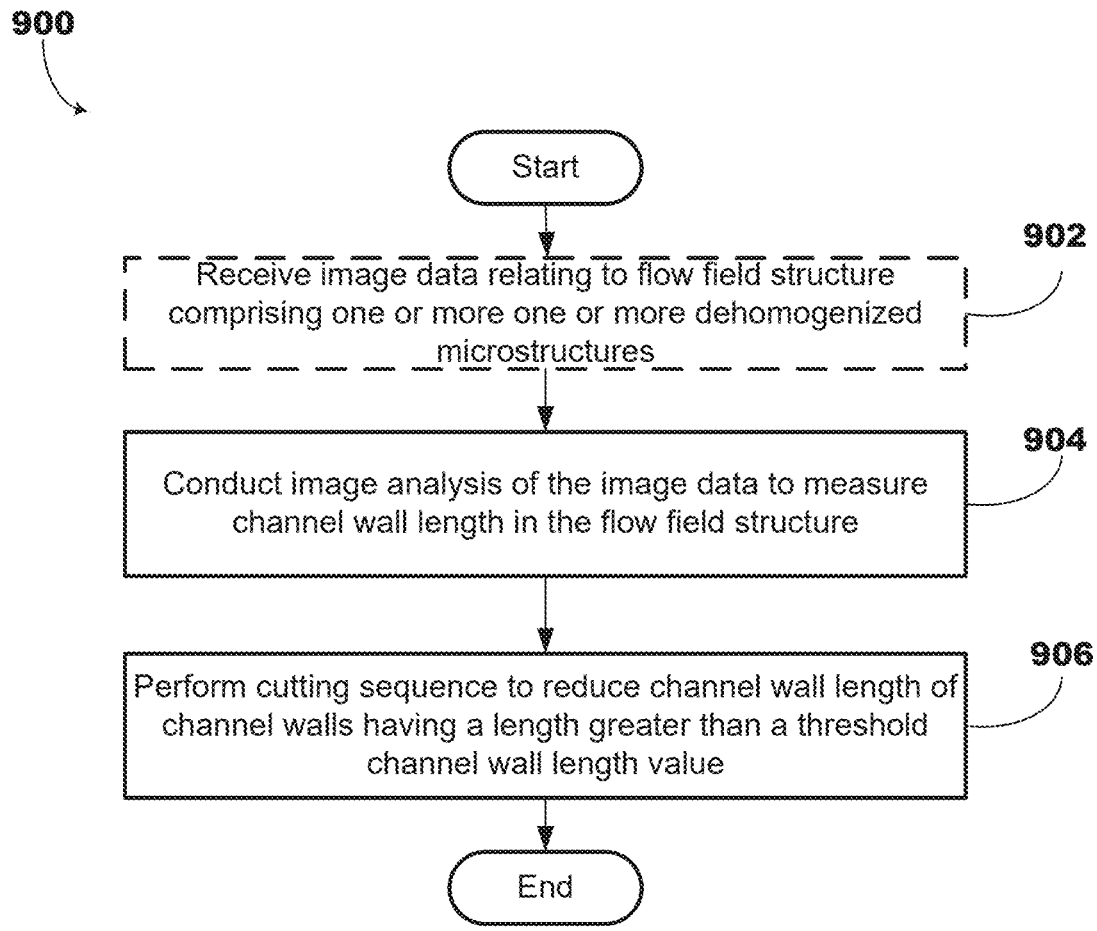

As illustrated in FIG. 9, in the method 900, illustrated processing block 902 includes receiving, by one or more computing devices having one or more processors, image data relating to a fluid flow field structure for a bipolar plate body. The fluid flow field structure can comprise one or more dehomogenized microstructures such as, for example, Turing-pattern microstructures, but embodiments are not limited thereto. Thus, this disclosure contemplates the fluid flow field structure comprising any suitable structural configuration that falls within the spirit and scope of the principles of this disclosure.

The method 900 can then proceed to illustrated process block 904, which includes conducting, by the one or more computing devices, image analysis of the image data to measure the channel wall lengths in the flow field structure.

The method 900 can then proceed to illustrated process block 906, which includes performing a cutting sequence, by the one or more computing devices and in response to the measurement, on channel walls having a length greater than a threshold channel wall length value. The cutting sequence may be comprise applying one or more cuts that are approximately perpendicular to the identified channel wall or oblique to the identified channel wall. The method 900 can then terminate or end after execution of process block 906.

Figure 10:
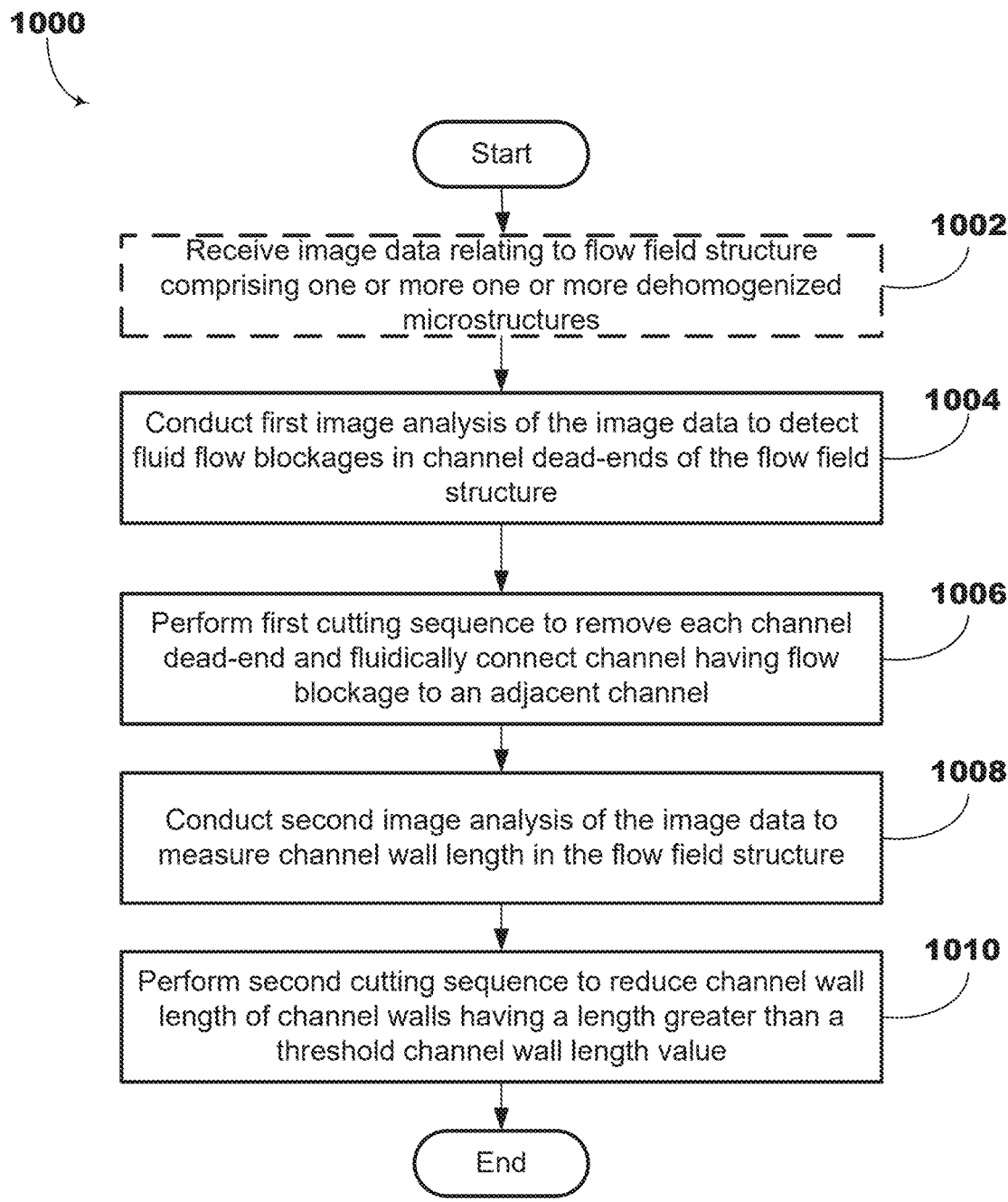

As illustrated in FIG. 10, in the method 1000, illustrated processing block 1002 includes receiving, by one or more computing devices having one or more processors, image data relating to a fluid flow field structure for a bipolar plate body. The fluid flow field structure can comprise one or more dehomogenized microstructures such as, for example, Turing-pattern microstructures, but embodiments are not limited thereto. Thus, this disclosure contemplates the fluid flow field structure comprising any suitable structural configuration that falls within the spirit and scope of the principles of this disclosure.

The method 1000 can then proceed to illustrated process block 1004, which includes conducting, by the one or more computing devices, a first image analysis of the image data to detect fluid flow blockages at channel dead-ends of the fluid flow field structure.

The method 1000 can then proceed to illustrated process block 1006, which includes performing a first cutting sequence, by the one or more computing devices in response to the first image analysis, to remove each channel dead-end in a manner that fluidically connects adjacent channels.

The method 1000 can then proceed to illustrated process block 1008, which includes conducting, by the one or more computing devices in response to the first cutting sequence, a second image analysis of the image data to measure the channel wall lengths in the flow field structure.

The method 1000 can then proceed to illustrated process block 1010, which includes performing a second cutting sequence, by the one or more computing devices and in response to the second image analysis, on channel walls having a length greater than a threshold channel wall length value. In that way, each identified channel wall having a length greater than a threshold channel wall length value will go from a single continuous channel wall having a length "x" to one or more short, discrete channel walls having a length that is less than "x." The cutting sequence may occur at regular intervals or irregular intervals. The cutting sequence may be comprise applying one or more cuts that are approximately perpendicular to the identified channel wall or oblique to the identified channel wall. The method 1000 can then terminate or end after execution of process block 1010.

The methods 500, 600, 700, 800, 900, and 1000 may be implemented for dehomogenized fluid flow structures to obtain a final fluid flow structure that effectively reduces the pressure drop of the dehomogenized flow channel pattern.

The terms "coupled," "attached," or "connected" may be used herein to refer to any type of relationship, direct or indirect, between the components in question, and may apply to electrical, mechanical, fluid, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the one or more embodiments can be implemented in a variety of forms. Therefore, while the embodiments are set forth, illustrated, and/or described in connection with particular examples thereof, the true scope of the embodiments should not be so limited since other modifications will become apparent to the skilled practitioner upon a study of the drawings, specification, and claims.

What is claimed is:

1. A method of designing a fluid flow field structure for a fuel cell bipolar plate, the method comprising, by one or more computing devices having one or more processors:
conducting image analysis of image data of a fluid flow field structure having one or more dehomogenized microstructures to identify channels having a fluid flow blockage at a channel wall dead-end; and
selectively removing, in response to the image analysis, the channel wall dead-end of each identified channel in a manner that fluidically connects each identified channel to an adjacent channel.

2. The method of claim 1, wherein the dehomogenized microstructures comprise dehomogenized Turing-pattern microstructures.

3. The method of claim 1, wherein conducting the image analysis comprises identifying fluid flow blockage at dead-ends as a first end point and identifying channel wall branches as a second end point.

4. The method of claim 3, wherein conducting the image analysis comprises pairing each first endpoint with the second endpoint of an adjacent neighboring channel wall branch.

5. The method of claim 4, wherein selectively removing comprises applying one or more cuts to a channel wall between the paired first endpoint and the second endpoint.

6. The method of claim 1, further comprising, before conducting the image analysis, optimizing homogenized anisotropic porous media by iteratively executing a gradient-based algorithm that incorporates objective functions of reaction variation and flow resistance.

7. The method of claim 6, further comprising generating the fluid flow field structure in response to optimizing homogenized anisotropic porous media.

8. A method of designing a fluid flow field structure for a fuel cell bipolar plate, the method comprising, by one or more computing devices having one or more processors:
conducting image analysis of image data of a fluid flow field structure having one or more dehomogenized microstructures to measure a length of each channel wall in the fluid flow field structure; and
selectively cutting, in response to the image analysis, channels walls having a length greater than a threshold channel wall length value.

9. The method of claim 8, wherein the dehomogenized microstructures comprise dehomogenized Turing-pattern microstructures.

10. The method of claim 8, wherein selectively cutting comprises applying one or more cuts that are approximately perpendicular to the channel wall having a length greater than the threshold channel wall length value.

11. The method of claim 8, wherein selectively cutting comprises applying one or more cuts that are approximately oblique to the channel wall having a length greater than the threshold channel wall length value.

12. The method of claim 8, wherein conducting the image analysis comprises comparing the measured length value of each channel wall to the threshold channel wall length value.

13. The method of claim 8, further comprising, before conducting the image analysis, optimizing homogenized anisotropic porous media by iteratively executing a gradient-based algorithm that incorporates objective functions of reaction variation and flow resistance.

14. The method of claim 13, further comprising generating the fluid flow field structure in response to optimizing homogenized anisotropic porous media.

15. A method of designing a fluid flow field structure for a fuel cell bipolar plate, the method comprising, by one or more computing devices having one or more processors:
conducting a first image analysis of image data of a fluid flow field structure having one or more dehomogenized microstructures to identify channels having a fluid flow blockage at a channel wall dead-end;
selectively removing, in response to the image analysis, the channel wall dead-end of each identified channel in a manner that fluidically connects each identified channel to an adjacent channel;
conducting, in response to selectively removing the channel wall dead-end, a second image analysis of the image data to measure a length of each channel wall in the fluid flow field structure; and
selectively cutting, in response to the second image analysis, channels walls having a length greater than a threshold channel wall length value.

16. The method of claim 15, wherein the dehomogenized microstructures comprise dehomogenized Turing-pattern microstructures.

17. The method of claim 15, wherein:
conducting the first image analysis comprises identifying fluid flow blockage at dead-ends as a first end point and identifying channel wall branches as a second end point, and pairing each first endpoint with the second endpoint of an adjacent neighboring channel wall branch; and
selectively removing comprises applying one or more cuts to a channel wall between the paired first endpoint and the second endpoint.

18. The method of claim 15, wherein conducting the second image analysis comprises comparing the measured length value of each channel wall to the threshold channel wall length value.

19. The method of claim 15, further comprising, before conducting the first image analysis, optimizing homogenized anisotropic porous media by iteratively executing a gradient-based algorithm that incorporates objective functions of reaction variation and flow resistance.

20. The method of claim 15, further comprising generating the fluid flow field structure in response to optimizing homogenized anisotropic porous media.

* * * * *